(12) United States Patent
Dougherty et al.

(10) Patent No.: US 7,675,066 B1
(45) Date of Patent: Mar. 9, 2010

(54) ERASE-ON-DEMAND MEMORY CELL

(75) Inventors: Thomas K. Dougherty, Playa del Ray, CA (US); Tricia Veeder, Santa Barbara, CA (US); Gregory Tracy, Buellton, CA (US); Stephen A. Gabelich, San Pedro, CA (US); John J. Drab, Santa Barbara, CA (US)

(73) Assignee: Raytheon Company, Waltham, MA (US)

( * ) Notice: Subject to any disclaimer, the term of this patent is extended or adjusted under 35 U.S.C. 154(b) by 1041 days.

(21) Appl. No.: 11/246,418

(22) Filed: Oct. 7, 2005

(51) Int. Cl.
*H01L 29/12* (2006.01)

(52) U.S. Cl. .................................. 257/71; 257/E21.665

(58) Field of Classification Search .................. 257/467, 257/68, 71, E21.665
See application file for complete search history.

(56) References Cited

U.S. PATENT DOCUMENTS 6,128,220 A * 10/2000 Banyai et al. .......... 365/185.11
6,960,479 B2 * 11/2005 Li et al. .......................... 438/3
7,220,983 B2 * 5/2007 Lung ............................. 257/4
2003/0175487 A1 * 9/2003 Kita ........................... 428/209
2003/0235072 A1 * 12/2003 Kim et al. ................... 365/158

* cited by examiner

*Primary Examiner*—Wai-Sing Louie
*Assistant Examiner*—Bilkis Jahan
(74) *Attorney, Agent, or Firm*—Leonard A. Alkov

(57) ABSTRACT

An erase-on-demand memory cell 10(1) includes a memory layer 110 and a heating layer 130 that can heat memory layer 110 to at least an erase-effective temperature, to erase its data contents. Memory chips 270(1) and electronic systems 200 include cells 10(1). Electronic systems 200(1) include logic circuitry 210 to issue a signal to initiate heating. Electronic systems 200(2) include memory chips 270(2) with one or more erase-on-demand memory cells 10(2) that include a memory layer 110. One or more reservoirs 262 store chemicals. One or more valves 252 retain the chemicals, and respond to a signal to open, reacting the chemicals and/or exposing memory layers 110 to the chemicals. A method of erasing data contents of memory cells includes determining existence of an erase demand scenario, generating a signal in response to the erase demand scenario, and actuating erasure of the memory cells upon issue of the signal.

2 Claims, 4 Drawing Sheets

ERASE-ON-DEMAND MEMORY CELL

U.S. GOVERNMENT RIGHTS

The invention described herein was made with Government support under contract No. F33615-03-C-1417 awarded by the Department of the Air Force. The Government has certain rights in this invention.

BACKGROUND

Nonvolatile memories (e.g., electrically programmable read-only memories, electrically erasable and programmable read-only memories, Flash memory, ferroelectric memory, magnetoresistive random access memory ("MRAM"), phase change memory and magnetic media such as tapes and disks) retain data stored therein even when electrical power fails or is turned off. The data-retaining ability of such nonvolatile memories makes them attractive for certain memory applications, but also makes them potential targets for unauthorized persons (e.g., spies, hackers, military opponents); these unauthorized persons might wish to read memory contents and/or power up and utilize connected systems that would normally be unavailable to them.

Ferroelectric memory cells may be made with ferroelectric materials such as, for example, strontium bismuth tantalate, denoted "SBT" (optionally doped with niobium), bismuth lanthanum titanate, denoted "BLT" and/or lead zirconium titanate, denoted "PZT" (optionally doped with lanthanum or calcium). SBT, BLT, PZT and other ferroelectric materials have a lattice structure that includes ions that can move among possible ionic sites of the lattice in response to applied electric fields. Ions that move among the possible ionic sites create a charge displacement within the material, which may then act as a switching component in a ferroelectric memory cell.

The ferroelectric memory cell is thus a form of nonvolatile memory; it retains its data contents when power is turned off so long as its memory layer—the ferroelectric layer—remains substantially below the Curie temperature. At or near the Curie temperature, thermal excitation of the lattice overwhelms the forces that hold the ions in specific ionic sites, effectively neutralizing charge displacement that previously existed within the ferroelectric layer.

U.S. Pat. Nos. 5,885,648 and 5,908,658 describe processes for making ferroelectric materials suitable for use in ferroelectric memory and are incorporated herein by reference. U.S. Pat. No. 5,606,146 describes energetic composites and a method of providing chemical energy, and is further incorporated herein by reference. Certain reactive substance pairs disclosed within the '146 patent include $CuClO_4$ and Al, $Cu(NO_3)_2$ and Al, CuO and Al, $Fe_2O_3$ and Al (also known as thermite), S and Ca, CuO and Mg, $TiF_4$ and Ca, S and Na, S and Mg, and $TiF_4$ and Li.

SUMMARY

In one embodiment, an erase-on-demand memory cell includes a memory layer and a heating layer. The heating layer can heat the memory layer to at least an erase-effective temperature of the memory layer, to erase data contents of the memory layer.

In one embodiment, an erase-on-demand memory chip includes one or more memory cells and a heating layer. The heating layer can heat the memory layer to at least an erase-effective temperature of the memory layer, to erase data contents of the memory layer.

In one embodiment, an electronic system includes a memory chip with one or more memory cells and a heating layer. The heating layer can heat the memory layer to at least an erase-effective temperature of the memory layer, to erase data contents of the memory layer. Logic circuitry may issue an erase-on-demand signal to initiate the heating.

In one embodiment, an electronic system includes a memory chip with one or more memory cells. Each of the memory cells has a memory layer. A reservoir stores one or more chemicals that can react with the memory layer. A valve can retain the chemicals within the reservoir, and is responsive to an erase-on-demand signal to open and expose the memory layer to the chemicals. Logic may issue the erase-on-demand signal.

In one embodiment, an electronic system includes a memory chip with one or more memory cells. Each of the memory cells has a memory layer. A plurality of reservoirs stores one or more chemicals. One or more valves can retain the chemicals within the reservoirs. The valves are responsive to an erase-on-demand signal to open and combine the chemicals to form reaction products that react with the memory layer, to erase data contents of the memory chip.

In an embodiment, a method erases data contents of one or more memory cells, including: determining existence of an erase demand scenario and generating an erase-on-demand signal in response to the erase demand scenario. Upon issue of the erase-on-demand signal, erasure of the memory cells is actuated.

DETAILED DESCRIPTION OF DRAWINGS

Figure 1:
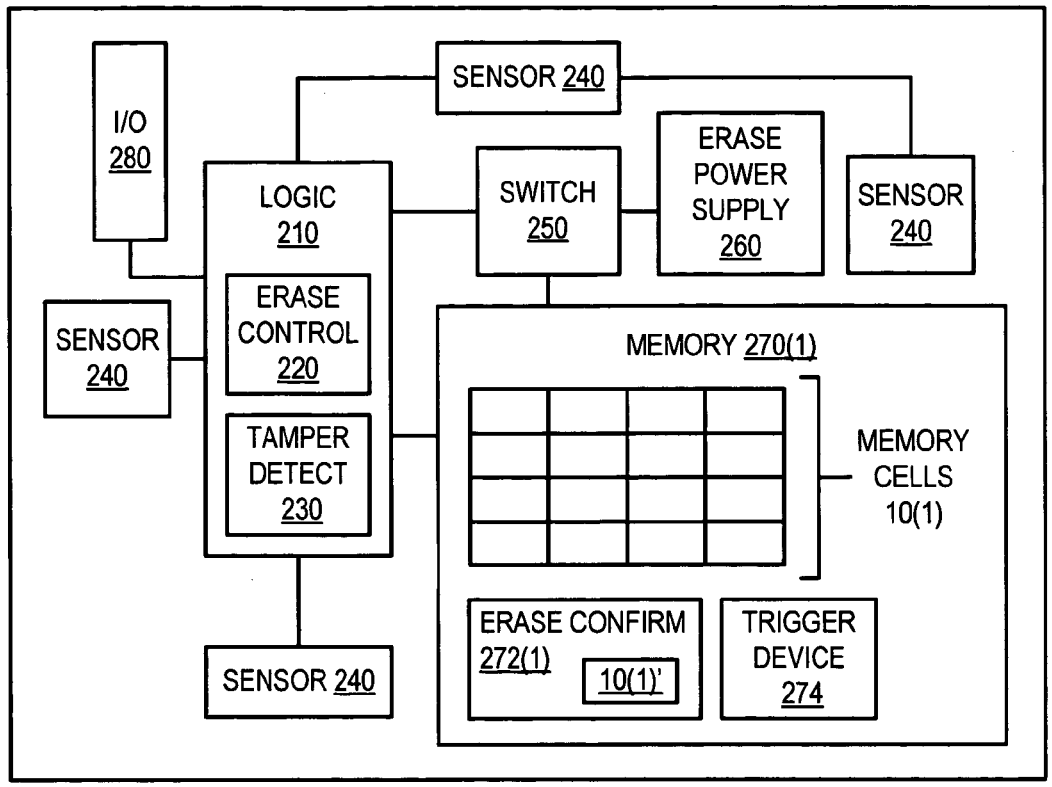
FIG. 1 shows a block diagram of one system employing erase-on-demand memory cells, in accord with an embodiment.

In the embodiment of FIG. 1, an electronic system 200(1) employs erase-on-demand memory cells 10(1). Memory cells 10(1) may be ferroelectric memory cells. System 200(1) is for example a system that utilizes non-volatile memory, such as: a computer, a computer-controlled machine, an appliance, a vehicle, a weapon system, an entertainment system (e.g., audio and/or video and/or gaming system), and/or a communication device (e.g., cell phone, personal digital assistant). Logic 210 (e.g., a processor) within system 200(1) may be used to control system 200(1), and may further include an optional erase control circuit 220 and/or an optional tamper detect circuit 230, as discussed below. Illustratively, erase-on-demand memory cells 10(1) are shown as an array within a memory chip 270(1); the number and arrangement of these cells may vary. Memory chip 270(1)

may also include other memory cells (not shown) such as, for example, dynamic random access memory ("RAM") cells and/or static RAM cells.

In the embodiment of FIG. 1, memory chip 270(1) is shown with an erase confirm circuit 272(1) and a trigger device 274; system 200(1) is also shown with an input/output ("I/O") device 280, one or more sensors 240, an erase power supply 260 and a switch 250. I/O device 280 facilitates interaction with a user, to input to or receive information from system 200(1). Erase confirm circuit 272(1), trigger device 274, sensors 240, erase power supply 260 and switch 250 are described in more detail below.

System 200(1) operates to erase data contents of erase-on-demand memory cells 10(1) by heating a memory layer (e.g., see memory layer 110, FIG. 2) of memory cells 10(1) to an erase-effective temperature of the layer. An erase-on-demand signal may be used to initiate the erasure, as now described. Memory layer 110(1) may be a ferroelectric memory layer.

Specifically, the erase-on-demand signal may be issued by erase control circuit 220 in response to existence of one or several erase demand scenarios. In one such erase demand scenario, erase control circuit 220 acts on input received by logic 210 through I/O 280; for example, one or more commands communicated through I/O 280 direct erase control circuit 220 to issue the erase-on-demand signal. In another such erase demand scenario, the erase-on-demand signal is initiated automatically in response to a logic and/or memory condition determined by logic 210; for example, erase control circuit 220 may be configured to respond to commands through I/O 280 to issue an erase-on-demand signal if certain data and/or logic states exist.

Another such erase demand scenario may include a time-out feature wherein erase control circuit 220 issues the erase-on-demand signal when an amount of time has elapsed; in this way, when a reset signal is received, system 200(1) is periodically reset to prevent erasure of memory cells 10(1). Such a scenario may be used, for example, to ensure that a system remains in "friendly hands;" if the reset signal is not received within a designated time period, the system automatically erases the data contents of the erase-on-demand memory cells.

In an embodiment, the erase-on-demand signal issues when tamper detect circuit 230 determines existence of an erase demand scenario involving tampering; one or more sensors 240 may be used to determine whether tampering has occurred. In one example, a sensor 240 includes conductive tape that is broken when system 200(1) is opened (e.g., broken into). In another example, a sensor 240 (e.g., an accelerometer) detects movement of components within system 200 (1), or shaking or impact of other objects against system 200(1). Accordingly, tamper detect circuit 230 may issue a tamper erase-on-demand signal based on information from sensors 240, logic states of logic 210 and/or data states of memory chip 270(1).

Erase power supply 260 is configured to store power that selectively heats memory chip 270(1). It is, for example, a capacitor, a battery, an internal power source within system 200(1) or a connection to a power source external to system 200(1). Erase power supply 260 may be used for other purposes within system 200(1), or may be a dedicated power supply only used for this heating of memory chip 270(1). In an embodiment, the erase-on-demand signal is initiated from erase control circuit 220 or tamper detect circuit 230 and operates switch 250 to release power into the heating layer (see FIG. 2) of one or more memory cells 10(1).

In an embodiment, erase confirm circuit 272(1) provides a logic state confirming whether cells 10(1) of memory chip 270(1) are erased or not. To facilitate this, erase confirm circuit 272(1) may include one or more erase-on-demand memory cells 10(1)' that determine a logic state of erase confirm circuit 272(1) (only one cell 10(1)' is shown in FIG. 1, for clarity of illustration). In an example of operation, memory cells 10(1)' are preprogrammed (e.g., at a time of manufacturing) so that erase confirm circuit 272(1) presents a "not-erased" logic state. Heating memory chip 270(1), to erase cells 10(1), also erases cells 10(1)'; thus when cells 10(1)' are erased, erase confirm circuit 272(1) presents an "erased" logic state for cells 10(1).

Trigger device 274 may also be used to activate an energetic heating layer (e.g., heating layer 130, FIG. 2) of erase-on-demand memory cells 10(1). In this example, trigger device 274 generates an electrical spark, operates a mechanical actuator, or forces current through a resistor (e.g., a fuse, to heat the resistor and "blow" the fuse) to activate the energetic heating layer.

Figure 2:
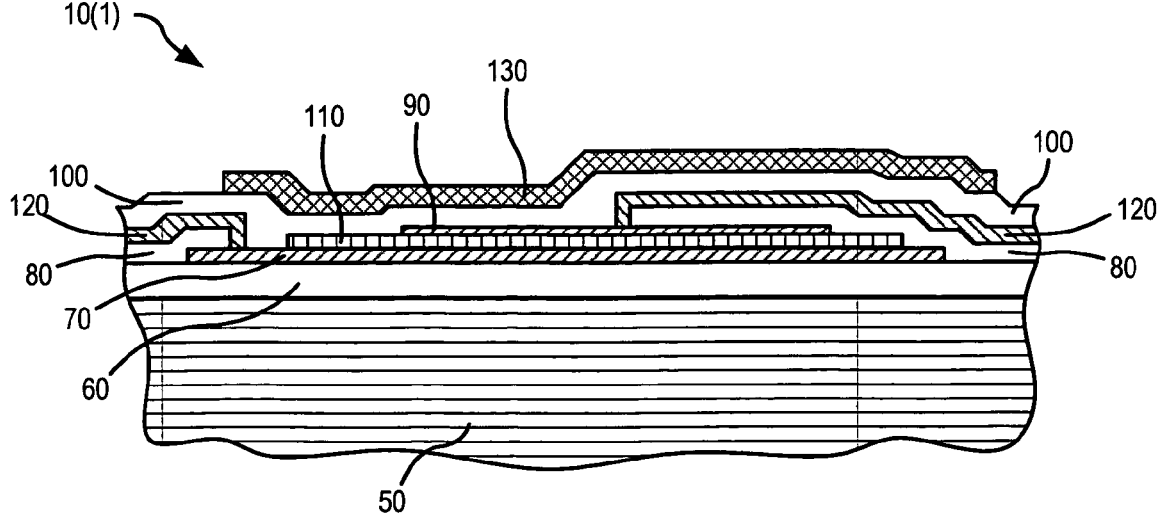
FIG. 2 is a cross-sectional view of one of the erase-on-demand memory cells of FIG. 1.

FIG. 2 is a cross-sectional view of one erase-on-demand memory cell 10(1). FIG. 2 may not be drawn to scale. Memory cell 10(1) includes a substrate 50, a dielectric layer 60, a first metal layer 70, an interlayer dielectric 80, a second metal layer 90, a passivation layer 100, a memory layer 110, a third metal layer 120, and a heating layer 130. Substrate 50 is, for example, silicon. Dielectric and passivation layers 60, 80 and 100 are materials typically utilized in microelectronics fabrication, such as silicon dioxide, silicon nitride, borosilicate or phosphosilicate glass, organic dielectrics and/or mixtures thereof. Metal layers 70, 90 and 120 include metals also used in microelectronics fabrication, such as aluminum, gold, copper, tantalum, platinum, palladium, titanium, tungsten and/or mixtures thereof.

Memory layer 110 makes memory cell 10(1) a nonvolatile memory cell, retaining its data contents when power is turned off as long as memory layer 110 remains substantially below a specific temperature. For example, when memory layer 110 is a ferroelectric layer, it retains a charge displacement as long as its temperature remains substantially below its Curie temperature. Other non-volatile memory cells, such as MRAM or phase change memory cells, may be similarly susceptible to loss of data contents upon reaching a temperature that changes properties of a memory layer thereof. A specific minimum temperature required to erase memory cell 10(1), denoted herein as an "erase-effective temperature," may be identified by testing a sample of memory cells 10(1). In the case of ferroelectric memory cells, the erase-effective temperature may be lower than the Curie temperature; in the case of other memory cells, the erase-effective temperature may be higher or lower than a temperature that changes properties of the memory layer. When memory layer 110 is a ferroelectric memory layer, it may be controlled so that an erase-effective temperature of memory cell 10(1) is within the range of 240 C to 440 C, due to properties of ferroelectric material. When memory layer 110 is another material, the erase-effective temperature may be within a broader range, such as 50 C to 500 C.

Thus heating layer 130, if activated, serves to heat memory layer 110 to at least the erase-effective temperature; it may be made of a resistive heating element such as, for example, a nichrome layer, or it may be an energetic layer that releases stored chemical energy as heat. When heating layer 130 is a resistive heating element, activation may include supplying power to heating layer 130 (e.g., supplying power from erase power supply 260 through switch 250, FIG. 1). An energetic layer may, for example, include reactive substance pairs such as $CuClO_4$ and Al, $Cu(NO_3)_2$ and Al, CuO and Al, $Fe_2O_3$ and Al (also known as thermite), S and Ca, CuO and Mg, $TiF_4$ and Ca, S and Na, S and Mg, or $TiF_4$ and Li. When heating layer 130 is an energetic layer, activation may include initiating a chemical reaction by blowing a fuse, by mechanically disturbing the energetic layer, or by creating an electrical spark (e.g., utilizing trigger device 274, see FIG. 1).

Alternatively, heating layer 130 may be configured for mechanical activation. In an example, heating layer 130 is sufficiently sensitive to mechanical disturbance such that physical tampering causes activation of layer 130. For example, layer 130 may be contiguously applied to other surfaces of system 200(1) such that a mechanical disturbance of such surfaces of system 200(1) activates layer 130.

Figure 3:
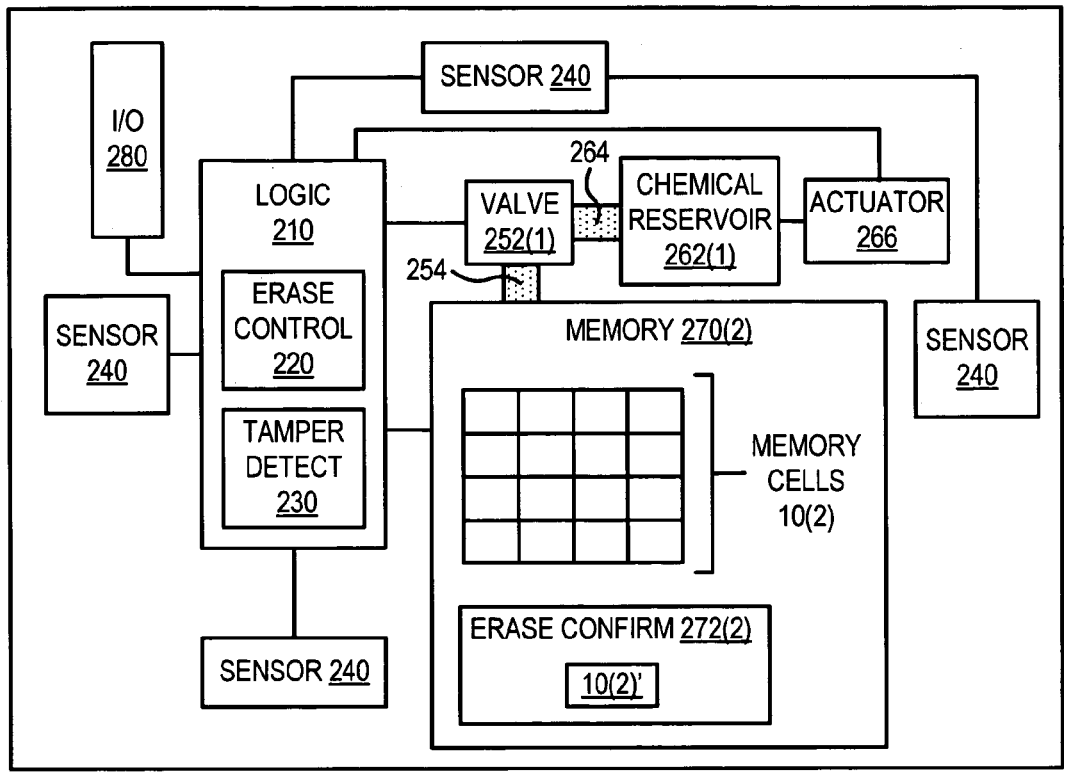
FIG. 3 shows a block diagram of another electronic system employing erase-on-demand memory cells, in accord with an embodiment.

FIG. 3 is a functional block diagram of one electronic system 200(2) that employs erase-on-demand memory cells 10(2). System 200(2) is also, for example, a system that utilizes non-volatile memory, such as a computer. System 200(2) is shown to include logic 210, one or more input/output ("I/O") devices 280 and/or sensors 240 that are the same as, or similar to, like-numbered elements of system 200(1). In FIG. 3, erase-on-demand memory cells 10(2) are shown as an array within a memory chip 270(2), the number and arrangement of these cells may vary. Memory chip 270(2) may also include other memory (not shown) such as, for example, dynamic RAM cells and/or static RAM cells.

In the embodiment of FIG. 3, memory chip 270(2) is shown with an erase confirm circuit 272(2), described in more detail below. System 200(2) is also shown with a chemical reservoir 262(1) that couples with a valve 252(1); valve 252(1) selectively isolates chip 270(2) from chemicals within reservoir 262(1) or exposes memory chip 270(2) to the chemicals. A conduit 264 between chemical reservoir 262(1) and valve 252(1), and a conduit 254 between valve 252(1) and memory chip 270(2), are shown; although it will be appreciated that such conduits need not be present if for example valve 252(1) mounts directly on chemical reservoir 262(1) and simply opens to a space adjacent to memory chip 270(2).

System 200(2) operates to erase data contents of erase-on-demand memory cells 10(2) after an erase-on-demand signal is issued, by exposing a memory layer (see memory layer 110, FIG. 4) of cells 10(2) to one or more chemicals that react with the memory layer, thereby erasing data stored in cells 10(2). The operation of erase control circuit 220 and/or tamper detect circuit 230 to issue an erase-on-demand signal is described above in connection with system 200(1), FIG. 1. In system 200(2), however, the erase-on-demand signal operates valve 252(1), exposing memory cells 10(2) to chemicals stored in reservoir 262(1).

System 200(2) may also be configured to expel the chemicals from reservoir 262(1) to memory chip 270(2) when an erase-on-demand signal is issued. For example, reservoir 262(1) may be pressurized, so that chemicals therein flow towards memory chip 270(2) as soon as valve 252(1) opens. Alternatively, system 200(2) may include an actuator 266, as shown. Actuator 266 is controlled by logic 210 and acts on reservoir 262(1) to expel its chemicals towards valve 252(1) and memory chip 270(2) after the erase-on-demand signal issues.

In an embodiment, erase confirm circuit 272(2) presents a logic state confirming whether memory cells 10(2) are erased or not. To facilitate this, erase confirm circuit 272(2) may include one or more erase-on-demand memory cells 10(2)' having exposed memory layers like cells 10(2) (only one cell 10(2)' is shown in FIG. 3, for clarity of illustration). Cells 10(2)' determine a logic state of erase confirm circuit 272(2); they may be preprogrammed (e.g., at a time of manufacturing) so that erase confirm circuit 272(2) presents a "not-erased" logic state. If chemicals release from reservoir 262 (1), memory layers 110 of cells 10(2)' react with the chemicals at the same time as memory layers 110 of cells 10(2). Accordingly, when cells 10(2)' are erased by reacting with the chemicals, erase confirm circuit 272(2) presents an "erased" logic state.

Figure 4:
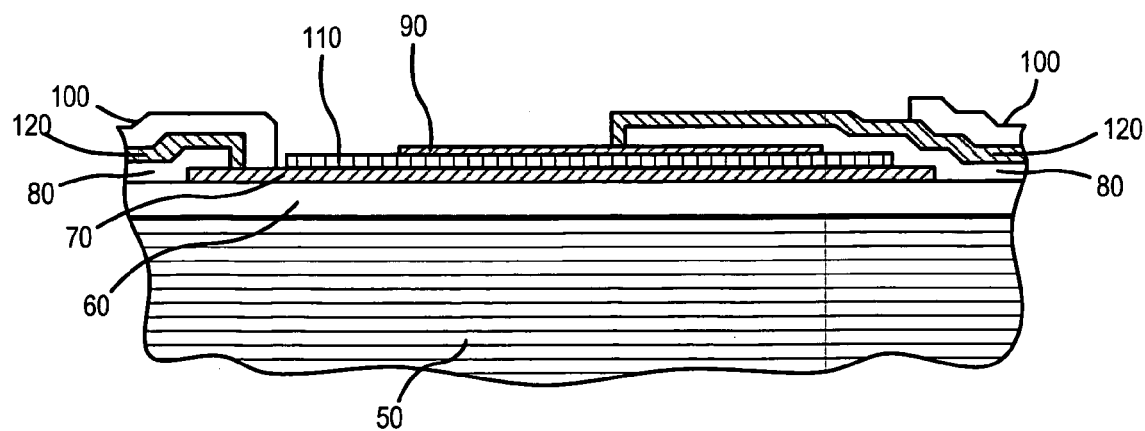
FIG. 4 is a cross-sectional view of one of the erase-on-demand memory cells of FIG. 3.

FIG. 4 is a cross-sectional view of one erase-on-demand memory cell 10(2). FIG. 4 may not be drawn to scale. Substrate 50, dielectric layers 60, 80 and 100, metal layers 70, 90 and 120 and memory layer 110 may be formed of the same materials as described in connection with the same-numbered elements of memory cell 10(1) (FIG. 2). Unlike memory cell 10(1), passivation layer 100 does not exist over memory layer 110 of memory cell 10(2). Without passivation layer 100, cell 10(2) operates in the same manner as cell 10(1), but exposes memory layer 110 so that it can react with chemicals released from reservoir 262(1). Chemicals that react with certain ferroelectric layers include, for example, hydrogen, water, and certain acids and bases; layers 110 of other memory cells may be susceptible to other chemicals. Chemical reservoir 262(1) serves to hold such chemicals until released.

It is appreciated that a memory cell 10(2) may include a passivation layer 100 that extends over memory layer 110, so long as layer 100 is a material that also reacts with, or is permeated by, chemicals of reservoir 262(1). Such a passivation layer 100 may improve manufacturability and reliability of memory cells 10(2) (e.g., by providing mechanical protection from scratches) while retaining the erasability of cells 10(2) when exposed to chemical(s). In an embodiment, passivation layer 100 forms channels that direct chemicals to memory layer 110, while still improving manufacturability and reliability of memory cells 10(2).

Figure 5:
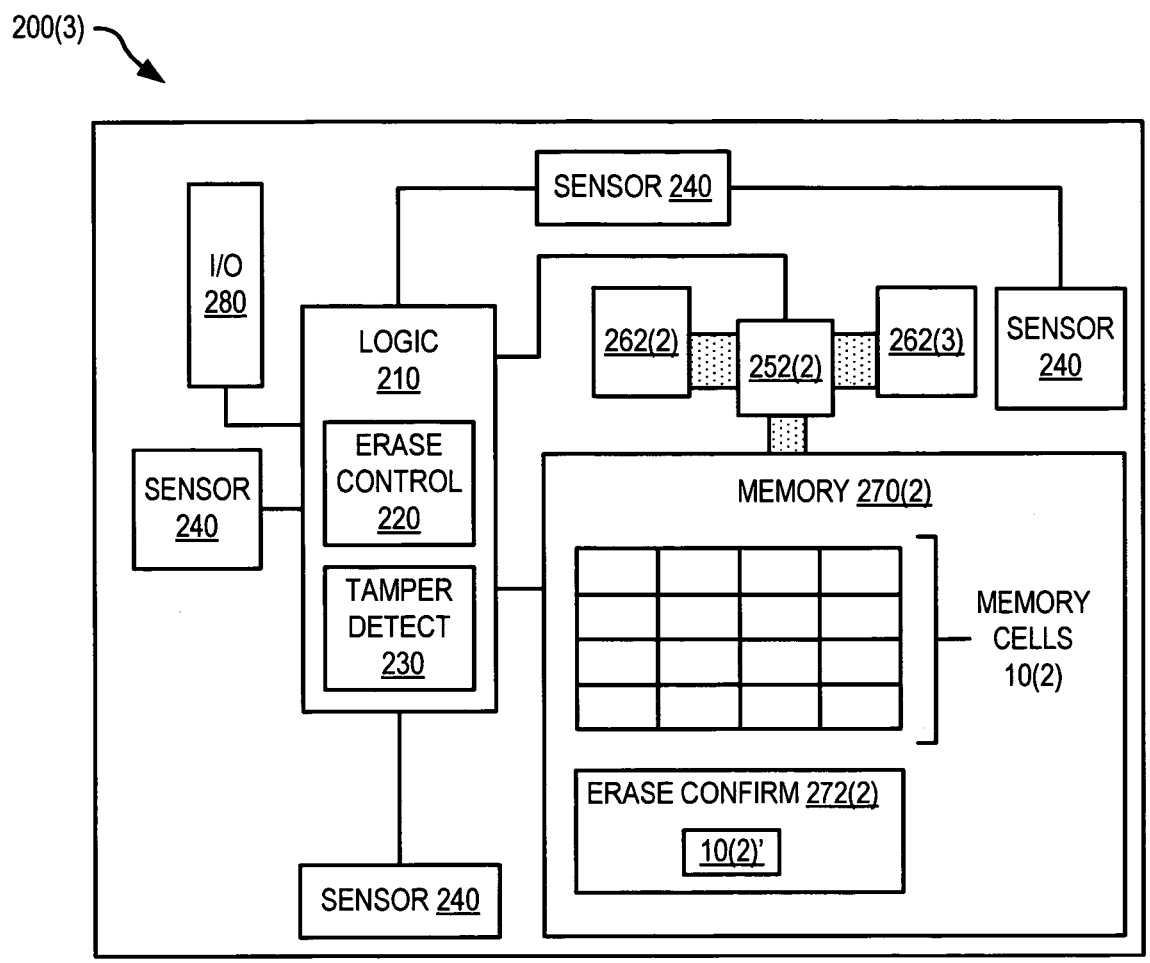
FIG. 5 shows a block diagram of another electronic system employing erase-on-demand memory cells, in accord with an embodiment.

FIG. 5 is a functional block diagram of one electronic system 200(3) that includes one or more erase-on-demand memory cells 10(2). System 200(3) is again, for example, a system that utilizes non-volatile memory, such as a cell phone. System 200(3) includes logic circuitry 210, input/output ("I/O") functionality 280, memory chip 270(2)(containing cells 10(2), 10(2)') and/or sensors 240 that are the same as or similar to like-numbered elements of systems 200(1), 200(2). System 200(3) includes chemical reservoirs 262(2) and 262(3) that connect to a valve 252(2); valve 252(2) selectively isolates chemicals within reservoirs 262(2) and 262(3) from each other and from memory chip 270(2), or exposes memory chip 270(2) to reaction products generated from chemicals of reservoirs 262(2) and 262(3).

System 200(3) is configured to erase data contents of erase-on-demand memory cells 10(2) after an erase-on-demand signal is issued, by reacting chemicals of reservoirs 262(2) and 262(3) and exposing a memory layer (e.g., memory layer 110, FIG. 4) of cells 10(2) to reaction products. The reaction products react with the memory layers, thereby erasing data stored in cells 10(2).

More particularly, the operation of erase control circuit 220 and/or tamper detect circuit 230 to issue an erase-on-demand signal is described above in connection with systems 200(1). In system 200(3), however, the erase-on-demand signal operates valve 252(2), exposing memory cells 10(2) to reaction products from chemicals stored in reservoirs 262(2) and 262 (3). System 200(3) may also be configured to expel the chemicals from reservoirs 262(2) and 262(3) to memory chip 270(2) when the erase-on-demand signal issues. For example, reservoirs 262(2) and/or 262(3) may be pressurized so that chemicals therein flow towards memory chip 270(2) as soon as valve 252(2) opens. Alternatively, system 200(2) may include logic-controlled actuators (not shown) that act on reservoirs 262(2) and 262(3) in the same manner as actuator 266 acts on reservoir 262(1) (FIG. 3). Or, reaction products may expand in comparison to the initial volume of the chemicals (e.g., when solids and/or liquids react to produce a gas) so that this expansion forces reaction products toward memory chip 270(2).

Although two chemical reservoirs 262(2) and 262(3) are shown in FIG. 5, system 200(3) may include a different number of chemical reservoirs, valves and actuators, to generate reaction products that react with memory layers 110 of memory cells 10(2) to erase data therein.

It is appreciated that the illustration of logic 210, memory chip 270, sensors 240, switches 250, erase power supply 260, valves 252, reservoirs 262, actuators 266 and I/O 280 as separate components within systems 200(1)-200(3) is exemplary, that such systems need not require all such components, and that such components may be separate from one other or reside within a single common housing or enclosure. Those skilled in the art recognize, upon reading and fully appreciating this disclosure, that numerous possibilities for integrating certain components with each other (e.g., combining logic 210, memory chip 270 and/or other components on a single chip) exist, and that components of systems 200 may be distributed over subsystems that are physically separate from each other.

Figure 6:
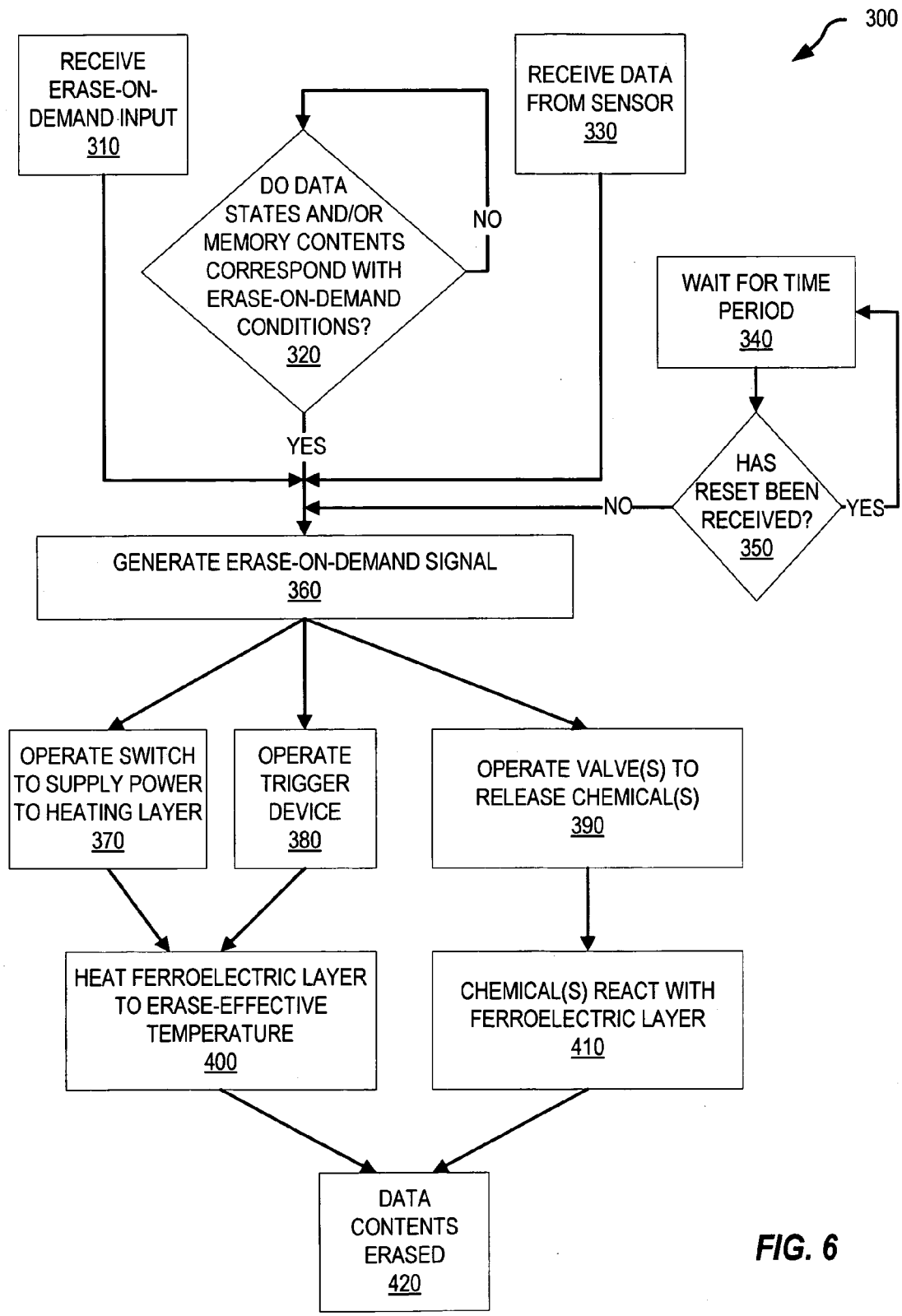
FIG. 6 shows a flowchart illustrating exemplary method steps for erasing data contents of an erase-on-demand memory cell.

FIG. 6 shows a flowchart illustrating exemplary steps of a method 300 for erasing data contents of an erase-on-demand memory cell (e.g., cells 10(1) or 10(2)). Method 300 may be performed, for example, by systems 200(1)-200(3) under control of logic 210. As discussed below, "system 200" denotes any of systems 200(1)-200(3) and "cells 10" denote any number or type of erase-on-demand memory cells 10(1), 10(2).

Steps 310 through 350 correspond to techniques that system 200 may utilize to determine whether or not to generate an erase-on-demand signal; and system 200 may be configured to perform all or only a subset of steps 310 through 350. In step 310, system 200 receives an erase-on-demand input. In an example of step 310, system 200 receives input through I/O 280 directing system 200 to erase cells 10. In step 320, system 200 evaluates data states and/or memory contents. In an example of step 320, system 200 evaluates logic states of logic 210 and/or data contents of cells 10. If the logic states and/or data contents correspond to predetermined conditions for erase-on-demand, step 360 commences; otherwise step 320 commences. Step 330 receives data that may indicate tampering from a sensor. In an example of step 330, system 200 receives data from one or more sensors 240.

Steps 340 and 350 operate as a loop wherein step 340 waits for a time period, after which step 350 checks to see if a reset has been received. If a reset has been received, step 340 commences; otherwise step 360 commences. Steps 340 and 350 may be performed, for example, by logic 210, with I/O 280 being operable to receive a reset.

Step 360 generates an erase-on-demand signal. In an example of step 360, erase control circuit 220 or tamper detect circuit of logic 210 generates the erase-on-demand signal. Steps 370, 380 and 390 are shown illustratively and depend upon the configuration of a system 200. In the case of system 200(1), where cells 10(1) are erased by heating of a resistive layer 130 (FIG. 2), step 370 operates a switch (e.g., switch 250) to connect power from an erase power supply (e.g., erase power supply 260) with layer 130. In the case of system 200(1), where cells 10(1) are erased by heating of an energetic layer 130 (FIG. 2), step 380 operates a trigger device (e.g., trigger device 274) to activate layer 130. Examples of step 380 are trigger devices operating to generate an electrical spark, to operate a mechanical actuator, or to force current through a resistor to "blow" a fuse. In the case of systems 200(2) or 200(3), step 390 operates one or more valves (e.g., valves 252(1) or 252(2)) that release chemicals from chemical reservoirs (e.g., any of reservoirs 262(1)-262(3)).

Steps 400 and 410 result in the erasure of data contents of cells 10. Either of steps 370 or 380 lead to step 400, which heats a memory layer 110 of cells 10(1) (FIG. 2) to at least the erase-effective temperature of the cells. In step 410, chemicals react with a memory layer 110 of cells 10(2) (FIG. 4). As either of steps 400 and 410 conclude, data contents of cells 10 are erased, and method 300 ends at step 420.

The changes described above, and others, may be made in the erase-on-demand memory cells described herein, and chips and systems utilizing such erase-on-demand memory cells, without departing from the scope hereof. For example, packaging techniques may substantially confine heat generated by a heating layer 130 to cells 10, to ensure erasure of cells 10 and/or to minimize damage to adjacent components. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. An erase-on-demand memory cell, comprising:
   a memory layer; and
   a heating layer for heating the memory layer to at least an erase-effective temperature of the memory layer, whereby data contents of the memory layer are erased, the heating layer comprising an energetic layer, the energetic layer being a layer that releases stored chemical energy as heat, and wherein the energetic layer comprises a reactive substance pair that is one of $CuClO_4$ and Al, $Cu(NO_3)_2$ and Al, CuO and Al, $Fe_2O_3$ and Al, S and Ca, CuO and Mg, $TiF_4$ and Ca, S and Na, S and Mg, and $TiF_4$ and Li.

2. Memory cell of claim 1, wherein the energetic layer is activatable by mechanical disturbance.

* * * * *